United States Patent [19]
Knechtel et al.

[11] Patent Number: 5,258,069
[45] Date of Patent: Nov. 2, 1993

[54] PROCESS FOR PREPARING JOINT, SPACKLING AND TEXTURE COMPOUNDS FOR GYPSUM DRY WALLS

[75] Inventors: Arthur H. Knechtel, Chadds Ford, Pa.; Thomas J. Podlas, Hockessin, Del.

[73] Assignee: Aqualon Company, Wilmington, Del.

[21] Appl. No.: 839,798

[22] Filed: Feb. 24, 1992

[51] Int. Cl.5 ................................................ C09K 3/10
[52] U.S. Cl. ........................... 106/287.24; 106/162; 106/169; 106/177; 106/178; 106/197.1; 106/197.2; 106/203; 106/205; 106/208; 106/210; 106/213; 523/335; 524/55; 524/451; 524/460
[58] Field of Search ............... 106/170, 177, 178, 194, 106/197.1, 197.2, 198, 203, 205, 208, 210, 213, 162, 169, 287.24; 523/335; 524/55, 451, 460

[56] References Cited

U.S. PATENT DOCUMENTS

| | | | |
|---|---|---|---|
| 3,891,582 | 6/1975 | Desmarais | 260/17 R |
| 4,799,962 | 1/1989 | Ahmed | 106/208 |
| 4,883,536 | 11/1989 | Burdick | 106/194 |
| 4,883,537 | 11/1989 | Burdick | 106/194 |
| 5,080,717 | 1/1992 | Young | 106/197.1 |

OTHER PUBLICATIONS

Whistler et al, *Industrial Gums*, Academic Press, New York, 1974, pp. 706-708, 716 (no month avail.).

*Primary Examiner*—David Brunsman
*Attorney, Agent, or Firm*—James K. Luchs; David Edwards

[57] ABSTRACT

Used as a thickener a Fluidized Polymer Suspension (FPS) with or without salt as a suspending agent allows producing joint, spackling and texture compounds in significantly reduced time. Products produced with FPS are more uniform and stable than ones made with solid thickeners.

14 Claims, No Drawings

PROCESS FOR PREPARING JOINT, SPACKLING AND TEXTURE COMPOUNDS FOR GYPSUM DRY WALLS

FIELD OF THE INVENTION

The invention relates to joint, spackling and texture compounds prepared with a water-soluble thickener. In particular, the invention relates to compounds Prepared with a fluidized polymer suspension thickener.

BACKGROUND OF THE INVENTION

Joint compound preparation is described in U.S. Pat. No. 891,582. Assignee's U.S. Pat. application, Ser. No. 625,999, discloses the use of salt suspensions to prepare aqueous joint compounds.

Gypsum wallboard has displaced plaster in the erection of interior walls in the construction industry, especially in the United States. Wallboard is generally installed in large panels which are nailed and glued to the studs of the wall and fitted together until the entire section of the wall is covered. The joints, where sections of the board are butted together, are covered with joint compound, then with joint tape, and then the taped joints and all nails are covered with a joint compound which, upon hardening, can be sanded and smoothed so that it is imperceptible under paint, wallpaper or textured coating.

Joint compounds used with wallboard usually contain a resinous binder, limestone, clay, mica, lubricant, stabilizer and a thickener as the principle ingredients. These are mixed with water to form a homogeneous paste which is normally applied with a trowel.

Typically, the water soluble polymer used to thicken the joint compound is a cellulose ether, e.g., hydroxyethylcellulose (HEC), hydroxypropylmethylcellulose (HPMC), etc. One of the factors limiting the output of large quantities of a joint compound in a commercial plant is the relatively long time necessary to completely disperse and dissolve the water soluble polymer thickener. Because of this, the ingredients are usually mixed for times ranging from 20 to 60 minutes. The water soluble polymer may be dry blended with the other ingredients, or added as an aqueous slurry. In the latter case, the hydration rate of the water soluble polymer must be chemically retarded so that the slurry does not thicken prior to being added to the remaining ingredients. The slurry has a finite lifetime, measured in minutes, even when a chemical retarder is used to temporarily crosslink the polymer and delay the onset of hydration.

There are other problems associated with the manufacture of joint compounds. These are of both a technical and practical nature.

When a dry thickener is employed, problems arise with dustiness (health and potential explosion hazard); caking and lumping (hydrophilicity of the thickener); broken bags (waste and slipping hazards); messy storage area, bag disposal and inconvenience. The construction industry would welcome the elimination of any of the above.

The use of dry or state of the art thickeners results in a long production, time which is needed to properly disperse and dissolve the thickener. It also results in high energy consumption because of high torque required to mix the thickener with the other ingredients and in the long mixing time needed to dissolve and disperse the thickener.

SUMMARY OF THE INVENTION

It is the object of this invention to provide a new method for preparing aqueous joint compound formulations. One of the advantages of this new method is that it reduces the mix time needed to blend all of the ingredients into a homogeneous, ready-to-use joint compound within as little as five minutes instead of the typical 20 to 60 minutes. This results in considerable cost savings and convenience for the users. It is accomplished by preparing the water soluble polymer thickener in a novel fluidized suspension form and adding it directly to the mixture of other joint compound ingredients. As part of this new process it is not necessary to chemically retard the hydration rate of a water soluble polymer thickener. Blends of polymers may be used to impart desired properties to the joint compound.

Other advantages beside the reduced production time include:

- elimination of problems associated with handling dry thickener;
- ability to disperse the thickener under low shear mixing conditions;
- elimination of high torque due to temporary viscosity buildup which frequently occurs when dry thickener is used;
- lower energy consumption; and
- increased joint compound viscosity stability with aging;

The process involves the steps:

(1) preparing a 5 to 35% by weight water soluble polymer fluidized polymer suspension;

(2) preparing a water, filler, binder and pigment mixture;

(3) adding the suspension to the mixture with constant agitation; and (4) agitating to homogenize and stabilize a joint, spackling or texture compound.

DETAILED DESCRIPTION OF THE INVENTION

It has been discovered that productivity can be significantly increased and quality improved for a joint compound composed of latex binder, pigment and a thickener when the thickener is added as a fluid instead of the typical dry powder addition method.

Under a typical joint compound production scheme, the dry pigments, including the dry thickener, are added to a mixer to which latex and water are added. In the mixing process, the pigments are wetted out and the thickener is solubilized until a creamy, uniform mixture of water, latex and pigment is obtained. The typical mix time to achieve this homogeneous, creamy consistency ranges from 20–46 minutes. The next step in the process is to empty the mixer and package the resultant mixture in either a plastic pail or a polyethylene lined cardboard box for delivery to a customer.

Using this invention, the dry pigments are added to the latex and water in a mixer without the thickener being present. After the pigments have been thoroughly wetted out, the thickener, in the form of a fluid polymer system, is added and the resultant mixture is mixed until a creamy, uniform composition of water, latex, and pigment is obtained. This new order of addition allows the pigments to satisfy their demand for water by wetting thoroughly prior to the fluid Polymer system (the thickener) exerting its demand for water. Thus, dry lumps of unwetted pigments and also dry lumps of partially swollen thickener are prevented from forming and therefore the mixture reaches its homogeneous state more quickly. In addition, the use of a fluid thickener system will substantially reduce the mixing time since the time required for hydration and dissolution is drastically reduced. Mixing times of 5-7 minutes versus typically 20-60 minutes can be expected with the invention.

With the new procedure less torque is required to mix, and together with reduced mixing time, there is a reduction in energy consumption. The thickener is added as a Fluidized Polymer Suspension (FPS).

The more rapid mixing procedure described through the use of FPS will allow for a reduction in total production cycle time thus allowing for more batches to be produced per day. A 25-30% reduction in typical production cycle time would translate to a 25-30% increase in production capacity.

The time required to mix has been a bottleneck in joint compound production and a stumbling block to development of a continuous production process. With the drastic reduction in mix time required through the use of this invention (FPS), a continuous process system could easily be developed. Another benefit from the use of this novel invention is the favorable impact on the workplace environment. Since the FPS is received, stored and transported in tanks and pipes, all problems associated with the handling of dry thickeners are eliminated. Since the package for a fluid thickener system (a tank truck) is completely recyclable, there are no bag disposal problems.

The invention has industrial applicability for gypsum wall construction, repair and redecorating. The following examples and preparations illustrate the practice of the invention without being limiting.

Preparation A

Hydrophobically Modified Hydroxyethylcellulose (HMHEC) Fluidized Polymer Suspension The following ingredients were mixed to prepare a storage stable Fluidized Polymer Suspension (FPS).

|  | % |
|---|---|
| Water | 52.7 |
| AQU-D 3082 HMHEC (Aqualon Company) | 20.0 |
| Xanthan Gum | 0.2 |
| Proxel GXL Stabilizer | 0.1 |
| Sodium formate | 27.0 |

Brookfield viscosity was 1500 mPas and pH 7.5.

Preparation B

Methylhydroxypropylcellulose (MHPC)/Hydroxyethylcellulose (HEC) Fluidized Polymer Suspension The following ingredients were mixed to prepare a two polymer FPS component.

| Ingredient | Parts by Weight |
|---|---|
| Water | 52.7 |
| Natrosol ® 250 HXR HEC (Aqualon) | 50.0 |
| Metnocel ® 2405 MHPC (Dow Chemical) | 15.0 |
| Xanthan Gum | 0.2 |
| Proxel GXL Stabilizer | 0.1 |
| Sodium Formate | 27.0 |

Brookfield viscosity was mPas and pH 7.5.

Preparation C

Other FPS Equivalents

Both aqueous and nonaqueous Fluidized Polymer Suspensions were prepared as with Preparation A and B except that both cellulosic and noncellulosic water-soluble polymers were used alone and in combination. In addition, other salts and salt combinations were used including diammonium sulfate, potassium phosphate dibasic, sodium formate, potassium carbonate, diammonium phosphate and monosodium phosphate.

Preparation D

Multi-Polysacchardie Suspension (MPS) Without Salt

Salt free suspensions were prepared using the procedures described in Assignee's Ser. No. 645,549. Low molecular weight carboxymethylcellulose and guar and guar derivatives were used as the suspending polysaccharide.

Example 1

The following ingredients were mixed in a 2 gallon tank stirred with a Hobart mixer at medium speed.

| Ingredient | Weight % |
|---|---|
| Limestone (Georgia White No. 9) | 60.22 |
| Attapulgite (Gel B) Clay | 1.85 |
| UCAR ® 133 Latex (Union Carbide) | 2.25 |
| Mica (P80K) (available from Unimin Corp., Spruce Pine, North Carolina) | 2.75 |
| Propylene Glycol | 0.40 |
| Biocides | 0.05 |
| Water | 32.48 |

Mixing continued until all ingredients were thoroughly wetted. The total weight of ingredients in the tank was 800g.

With the mixer set at maximum, a 48g. portion of Preparation A was added in 30 seconds. Mixing continued for 5 minutes during which time the grainy mixture was converted to a homogeneous creamy final product.

Comparative Example

Example 1 was repeated except that dry polymer and additional water were added to obtain the same weight percent composition. Compared with a preparation which took about 5 minutes of mixing after FPS addition, it took almost 25 minutes after dry thickener addition to obtain an equivalent commercial product.

Example 2

Using the procedures described for Preparation B, a fluidized polymer suspension of mixture of methyl hydroxypropylcellulose and hydroxyethylcellulose polymer was prepared. A joint compound was prepared utilizing this fluidized suspension in the joint compound formulation given in Example 1, but with 2.0% attapulgite. The joint compound had very good properties, as demonstrated by the following:

| Appearance: | Creamy |
|---|---|
| Viscosity: | 540 B.U. |
| Adhesion: | Excellent |
| Sag Resistance: | Excellent |
| Cracking: | Very good |

Example 3

Example 1 was repeated except that the addition of latex was delayed until after Preparation A had been combined with the other ingredients. A homogeneous and creamy product is obtained.

Example 4

A joint compound was prepared as in Example 1 except that Preparation D was mixed with the latex prior to mixing with the other wetted ingredients. Preparation D, which contained no salt, mixed with the latex without causing coagulation.

Example 6

Preparations A, B, C and D are used to prepare spackling and texture compounds using procedures similar to Examples 1-5. In all cases, the initial grainy mixture is converted into a creamy homogeneous product in from 5 to 15 minutes.

What is claimed is:

1. A process for preparing a joint, spackling or texture compound for gypsum dry walls consisting essentially of the steps:
    (1) preparing a storage stable fluidized polymer suspension comprising 5 to 35% by weight of at least one water-soluble polymer thickening agent;
    (2) preparing a mixture of water, filler, binder and pigment;
    (3) adding the fluidized polymer suspension to said mixture with constant agitation; and
    (4) agitating the resultant mixture for a time sufficient to homogenize and stabilize a joint, spackling or texture compound;
wherein the total time required for this process is reduced by at least 25% compared to using a dry water-soluble polymer thickening agent.

2. The process of claim 1 where the water-soluble polymer in step (1) is one or more of hydroxyethylcellulose, hydroxypropylcellulose, methylhydroxypropylcellulose, methylcellulose, carboxymethylcellulose, hydrophobically modified hydroxyethylcellulose, hydrophobically modified ethylhydroxyethylcellulose, guar, carboxymethylguar, hydroxypropylguar, hydroxyethyl starch, hydroxypropylstarch, polyacrylate or polymethacrylate.

3. The process of claim 2 where the fluidized polymer suspension contains 20 to 30% by weight of a salt from the group of diammonium sulfate, potassium phosphate dibasic, sodium formate, potassium carbonate, diammonium phosphate and monosodium phosphate.

4. The process of claim 2 where in step (2) the mixture further comprises talc.

5. The process of claim 4 where in step (2) the filler is calcium carbonate or calcium sulfate dihydrate.

6. The process of claim 1 where in step (1) the fluidized polymer suspension contains xanthan gum as a stabilizing agent.

7. The process of claim 1 where in step (1) the fluidized polymer suspension further comprises a dispersing agent.

8. The process of claim 1 where in step (1) the fluidized polymer suspension contains 15-30% by weight water-soluble polymer in an aqueous phase.

9. The process of claim 1 where in step (1) the fluidized polymer suspension contains no salt and a latex is added to step (2) or (3).

10. The process of claim 1 where a latex is added in step (2).

11. The process of claim 1 where a latex is added in step (3).

12. The process of claim 1 where in step (1) the suspension comprises methylhydroxypropyl cellulose and hydroxyethylcellulose.

13. A process for preparing a joint, spackling or texture compound for gypsum dry walls involves the steps:
    (1) preparing a Fluidized Polymer Suspension (FPS) comprising at least one water-soluble thickening agent from the group of hydrophobically modified hydroxyethylcellulose, methylhydroxypropylcellulose, hydroxyethylcellulose, carboxymethylcellulose, carboxymethylguar, hydroxypropylcellulose and methylcellulose;
    (2) preparing a mixture of water, latex and calcium carbonate or calcium sulfate dihydrate;
    (3) adding the fluidized polymer suspension to said mixture with constant agitation; and
    (4) homogenizing the resultant mixture for a time sufficient to stabilize a joint, spackling or texture compound.

14. The process of claim 13 where in step (2) the mixture further comprises talc.

* * * * *

UNITED STATES PATENT AND TRADEMARK OFFICE
CERTIFICATE OF CORRECTION

PATENT NO. : 5,258,069

DATED : November 2, 1993

INVENTOR(S) : A. H. Knechtel and T. J. Podlas

It is certified that error appears in the above-identified patent and that said Letters Patent is hereby corrected as shown below:

Column 1, line 9
   "Prepared" should read --prepared--

Column 1, Line 14
   "891,582" should read --3,891,582--

Column 2, line 68
   "Polymer" should read --polymer--

Column 4, line 15
   "Multi-Polysacchardie" should read --Multi-Polysaccharide--

Column 6, line 31
   "FPS" should be deleted

Signed and Sealed this

Thirteenth Day of September, 1994

Attest:

BRUCE LEHMAN

*Attesting Officer*   *Commissioner of Patents and Trademarks*